United States Patent
Bender et al.

(10) Patent No.: US 7,630,719 B2
(45) Date of Patent: Dec. 8, 2009

(54) METHOD AND APPARATUS FOR RAPID ASSIGNMENT OF A TRAFFIC CHANNEL IN DIGITAL CELLULAR COMMUNICATION SYSTEMS

(75) Inventors: Paul E. Bender, San Diego, CA (US); Matthew S. Grob, La Jolla, CA (US); Gadi Karmi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 936 days.

(21) Appl. No.: 10/824,920

(22) Filed: Apr. 14, 2004

(65) Prior Publication Data

US 2004/0190471 A1   Sep. 30, 2004

Related U.S. Application Data

(63) Continuation of application No. 10/007,206, filed on Nov. 9, 2001, now Pat. No. 6,741,861, which is a continuation of application No. 09/158,697, filed on Sep. 22, 1998, now Pat. No. 6,366,779.

(51) Int. Cl.
*H04W 4/00* (2006.01)
*H04W 72/00* (2006.01)

(52) U.S. Cl. .................. 455/450; 455/434; 455/509

(58) Field of Classification Search .................. 455/403, 455/450, 434, 509, 455, 454, 464, 516; 370/329, 370/342, 322, 335, 341, 348, 431
See application file for complete search history.

(56) References Cited

U.S. PATENT DOCUMENTS 5,544,196 A   8/1996   Tiedemann, Jr. et al.

5,590,177 A * 12/1996 Vilmur et al. ............... 455/436

(Continued)

FOREIGN PATENT DOCUMENTS

EP   0765096   3/1997

(Continued)

OTHER PUBLICATIONS

International Search Report, PCT/US1999/021651 - International Search Authority - European Patent Office, Jan. 24, 2000.

*Primary Examiner*—Sonny Trinh
(74) *Attorney, Agent, or Firm*—S. Hossain Beladi; Eric Ho

(57) ABSTRACT

A method and apparatus for rapidly assigning traffic channels to a plurality of mobile stations in a wide area high-speed packet data cellular communication system. Mobile stations transmit access probes on randomly selected access channels to selected base stations to initiate traffic channel assignments. The access probe comprises a pilot preamble, a traffic channel request, and a pilot/data request channel (DRC). The pilot preamble allows the selected base station to easily detect the access probe transmission. The traffic channel request includes data that identifies the mobile station. Immediately after transmitting the traffic channel request, the mobile station begins communicating with the base station on both the forward and reverse communication links. The selected base station immediately supervises the mobile station's transmission power. The mobile station selects from a group of available power control sub-channels. The mobile station selects an available channel and an associated power control sub-channel from the list.

25 Claims, 2 Drawing Sheets

U.S. PATENT DOCUMENTS

| | | |
|---|---|---|
| 5,673,259 A | 9/1997 | Quick, Jr. |
| 5,802,465 A | 9/1998 | Hamalainen et al. |
| 5,828,662 A | 10/1998 | Jalali et al. |
| 5,926,500 A * | 7/1999 | Odenwalder ................ 375/144 |
| 5,978,365 A | 11/1999 | Yi |
| 6,044,074 A * | 3/2000 | Zehavi et al. ............... 370/350 |
| 6,052,594 A | 4/2000 | Chuang et al. |
| 6,078,572 A | 6/2000 | Tanno et al. |
| 6,256,301 B1 * | 7/2001 | Tiedemann et al. ......... 370/342 |
| 6,301,242 B1 * | 10/2001 | Lindsay et al. ............. 370/347 |
| 6,366,779 B1 | 4/2002 | Bender et al. |
| 6,574,211 B2 * | 6/2003 | Padovani et al. ............ 370/347 |
| 6,741,861 B2 | 5/2004 | Bender et al. |
| 7,096,026 B2 * | 8/2006 | Thorson et al. ............. 455/450 |
| 7,218,950 B2 * | 5/2007 | Qiu et al. .................... 455/522 |

FOREIGN PATENT DOCUMENTS

| | | |
|---|---|---|
| JP | 09-284850 | 10/1997 |
| WO | 97045970 | 9/2000 |
| WO | 97050266 | 10/2000 |

* cited by examiner

METHOD AND APPARATUS FOR RAPID ASSIGNMENT OF A TRAFFIC CHANNEL IN DIGITAL CELLULAR COMMUNICATION SYSTEMS

CLAIM OF PRIORITY UNDER 35 U.S.C. §120

The present Application for Patent is a Continuation and claims priority to patent application Ser. No. 10/007,206 entitled "Method and Apparatus for Rapid Assignment of a Traffic Channel in Digital Cellular Communication Systems" filed Nov. 9, 2001, now U.S. Pat. No. 6,741,861 now allowed, which is a Continuation of patent application Ser. No. 09/158,697 entitled "Method and Apparatus for Rapid Assignment of a Traffic Channel in Digital Cellular Communication Systems" filed Sep. 22, 1998, now issued as U.S. Pat. No. 6,366,779 and assigned to the assignee hereof and hereby expressly incorporated by reference herein.

BACKGROUND OF THE INVENTION

1. Field of the Invention

This invention relates to digital wireless communication systems, and more particularly to methods for rapidly assigning traffic channels in digital wireless communications rapidly assigning traffic channels in digital wireless communications systems.

2. Description of Related Art

Wireless communication systems facilitate two-way communication between a plurality of subscriber mobile radio stations or "mobile stations" and a fixed network infrastructure. Typically, the mobile stations communicate with the fixed network infrastructure via a plurality of fixed base stations. Exemplary systems include such mobile cellular telephone systems as Time Division Multiple Access (TDMA), Code Division Multiple Access (CDMA) systems, and Frequency Division Multiple Access (FDMA) systems. The objective of these digital wireless communication systems is to provide communication channels on demand between the mobile stations and the base stations in order to connect the mobile station users with the fixed network infrastructure (usually a wired-line system).

Mobile stations typically communicate with base stations using a duplexing scheme that allows for the exchange of information in both directions of connection. In CDMA communication systems, transmissions from a base station to a mobile station are referred to as "forward link" transmissions. Transmissions from a mobile station to a base station are referred to as "reverse link" transmissions. The basic radio system parameters and call processing procedures for exemplary prior art CDMA systems is described by the TIA specification which is entitled "Mobile Station-Base Station Compatibility Standard for Dual-Mode Wideband Spread Spectrum Cellular System," TIA/EIA/IS-95-A, published in May 1995 by the Telecommunications Industry Association, and referred to hereafter as "IS-95".

Both voice and data services are available using CDMA communication systems made in accordance with IS-95. However, disadvantageously, data calls use the same airlink protocols, traffic channels, physical layers, signaling methods, call processing schemes and airlink protocols as used by the voice calls. While the prior art call processing schemes and signaling methods are efficient and effective for voice services, they are inefficient for data services, especially when the data services comprise very short duration calls. As described in more detail below, it can take between two and three seconds to establish or "setup" an average voice traffic channel using the prior art call processing schemes. While this setup time may be acceptable for a voice call that, on the average, may have a duration of between 100 and 300 seconds, it is unacceptable for a data call having a duration of only a few seconds, or less. Therefore, an improved technique is needed for assigning data traffic channels in a CDMA communication system. The causes of traffic channel assignment delays in the prior art systems become apparent by reviewing CDMA call flow examples. Therefore typical prior art CDMA call flow examples are now described.

CDMA Call Flow Examples

Table 1 shows a simple call flow example as set forth in IS-95. Table 1 uses the following conventions:

All messages are received without error.

Receipt of messages is not shown (except in the handoff examples).

Acknowledgements are not shown.

Optional authentication procedures are not shown.

Optional private long code transitions are not shown.

TABLE 1

Simple Call Flow Example - Mobile Station Origination

| Mobile Station | | | | Base Station |
|---|---|---|---|---|
| Detects user-initiated call | | | | |
| Sends Origination Message | > | Access Channel | > | Sets up Traffic Channel Begins sending null Traffic Channel data |
| Sets up Traffic Channel | < | Paging Channel | < | Sends Channel Assignment Message |
| Receives $N_{Sm}$ consecutive valid frames | | | | |
| Begins sending the Traffic Channel preamble | | | | Acquires the Reverse Traffic Channel |
| Begins transmitting null Traffic Channel data | < | Forward Traffic Channel | < | Sends Base Station Acknowledgement Order |
| Begins processing primary traffic in accordance with Service Option 1 | < | Forward Traffic Channel | < | Sends Service Option Response Order |
| Optional | | | | Optional |
| Sends Origination Continuation Message | > | Reverse Traffic Channel | > | |

TABLE 1-continued

Simple Call Flow Example - Mobile Station Origination

| Mobile Station | | | Base Station |
|---|---|---|---|
| Optional | | | Optional |
| Applies ring back in audio path | < | Forward Traffic Channel | < Sends Alert With Information Message (ring back tone) |
| Optional | | | Optional |
| Removes ring back from audio path (User conversation) | < | Forward Traffic Channel | < Sends Alert With Information Message (tones off) (User conversation) |

Table 1 shows a simple call flow example wherein a mobile station originates a call. Base station originated calls follow similar procedures. Messages are transmitted from the mobile station to the base station using the access channel. Messages are transmitted from the base station to the mobile station using the paging channel. As shown in Table 1, the mobile station first detects a user-initiated call, and then sends an "origination" message via the CDMA access channel. The access channel is a slotted random access channel. The mobile station transmits on the access channel using a random access procedure. Many parameters of the random access procedure are supplied by the base station in an access parameters message. The entire process of transmitting one message and receiving (or failing to receive) an acknowledgement for that message is called an "access attempt." Each transmission in the access attempt is called an "access probe." Within an access attempt, access probes are grouped into access probe sequences. Each access probe sequence comprises a fixed number of access probes. The first access probe of each access probe sequence is transmitted at a specified power level relative to the nominal open loop power level. Each subsequent access probe is transmitted at a power level that is a specified amount higher than the previous access probe.

In normal CDMA operation, when a mobile station user initiates a phone call, the mobile station sends an access probe to the base station. If the access probe is properly received by the base station, the mobile station should receive back an acknowledgement from the base station. Once the acknowledgement is received by the mobile station, the mobile station is instructed by the base station to wait and to stop sending further access probes to the base station. This is necessary because access probes produce interference on the communication channel. The mobile station therefore waits until it is assigned a traffic channel by the base station. The base station then communicates this request for a traffic channel and information about the mobile station to a base station controller (BSC). The BSC performs several administrative functions, possibly including authenticating the mobile station. The BSC then reviews the pool of available resources and allocates an element for the requesting mobile station.

As shown in Table 1, the base station informs the mobile station of the traffic channel assignment by sending a channel assignment message via the paging channel. Once the mobile station receives its channel assignment from the base station, it changes its receive and transmit frequencies, in addition to other relevant parameters, to the assigned traffic channel. The mobile station then attempts to initiate communication on the assigned traffic channel by establishing or "setting up" the traffic channel. if the traffic channel initialization is successful, the mobile station then acquires the traffic channel. The mobile station then begins sending a preamble on the reverse traffic channel to allow the base station to acquire the mobile station. As shown in Table 1, the base station acquires the reverse traffic channel and sends a base station acknowledgement order to the mobile station if the reverse traffic channel was properly acquired. At this point the mobile station and the base station begin negotiating service. The communication link can fail at any point during this negotiation process. However, if the negotiation process is successful, communication commences and a telephone conversation ensues. if the mobile station receives pilots from more than one base station, it may then request the allocation of additional traffic channels from the other base stations.

The prior art traffic channel assignment procedures shown in Table 1 take a relatively long period of time to execute. For example, from the time a base station receives a traffic channel request from a mobile station via the access channel, it typically takes between two and three seconds before a traffic channel is assigned and a base station acknowledgment order is transmitted to the mobile station. As noted above, this service delay is acceptable for voice services wherein the duration of voice calls are typically between 100 and 300 seconds. However, this service delay is unacceptable for data services wherein the duration of data calls are typically only a few seconds, or less. In addition, the assignment of traffic channels utilizes scarce system resources such as specific base station hardware, limited numbers of code channels, and transmission bandwidth (which is required both for tracking and for power control even when no data is transmitted). Therefore, to improve system capacity and throughput, it is advantageous to rapidly de-assign traffic channels whenever the user terminal goes dormant. That is, whenever the user terminal and the base station no longer have information to exchange, it is desirable to rapidly de-assign the traffic channel associated with the mobile station and to quickly re-assign the traffic channel when more data is presented for transmission.

In addition to delaying service to the user (whether the service be voice or data based), delays associated with the assignment of traffic channels create further delays in providing power control of the user terminal (typically a cellular telephone). Because the user terminal's transmission power can vary greatly, it is important to control the power of the user terminal as quickly as possible to avoid unnecessary co-channel interference that can both reduce system capacity and result in loss of the traffic channel. Therefore, it is desirable to both reduce the delays associated with the assignment of traffic channels and supervise the user terminals as quickly as possible. The present invention provides a method and apparatus that address these needs by rapidly assigning traffic channels to mobile stations in a wireless communication system. The present invention also provides a mechanism for rapidly and efficiently controlling the transmission power of the requesting mobile stations.

SUMMARY OF THE INVENTION

The present invention is a novel method and apparatus for rapidly assigning traffic channels in a wireless high-speed packet data communication system. The method and apparatus uses an access probe comprising a pilot preamble, a traffic channel request, and a pilot/data request channel (DRC) field. The access probe is transmitted to a selected base station via a reverse link access channel whenever a mobile station initiates a traffic channel assignment request. The mobile stations randomly select the access channels. The access probe is masked using a long code cover equal to an access channel cover code. All mobile stations use the same access channel cover when transmitting on a selected access channel. The mobile station transmits a sequence of access probes of increasing power until the access attempt is either successful or terminates. The mobile station monitors the forward link control channel and the forward link traffic channel while it is transmitting access probes to the base station.

The pilot preamble of the access probe allows the selected base station to easily detect the access probe transmission. In accordance with the present inventive method and apparatus, the mobile station transmits the traffic channel request immediately following the transmission of the pilot preamble. The traffic channel request includes data that identifies the requesting mobile station to the base station. Typically, this identifying data comprises an MSI that was previously assigned to the mobile station when it registered with the wireless packet data system. In addition to transmitting its MSI, the mobile station also transmits data that identifies the signal strengths and identities of all other base stations having received signal strengths exceeding a pre-determined threshold. Immediately after the mobile station transmits the traffic channel request it can begin using the reverse link traffic channel to transmit useful data to the selected base station. In one embodiment, the mobile station transmits the pilot/DRC field to the best base station it receives (i.e., the base station with the strongest signal received by the mobile station). The DRC includes traffic channel data rate information and is used by the mobile station to request the maximum data rate that it can reliably demodulate. The mobile station continues to transmit the pilot/DRC field for a period defined by the access probe tail.

Rather than waiting for the base station to authenticate and to assign a traffic channel to the mobile station, the mobile station begins communication on the traffic channel (identified by its MSI) immediately after transmission of the access probe. In essence, the traffic channels are pre-assigned to the mobile stations. In addition to speeding the assignment of traffic channels in a wireless packet data communication system, the present method and apparatus also allows base stations to begin supervising the transmission power levels of the mobile station immediately after the transmission of the access probe. In one embodiment, the mobile stations select from a group of available power control sub-channels. The mobile station uses the selected power control sub-channel when it begins to transmit data on the reverse communication link. The base station subsequently associates the mobile's MSI with the selected power control sub-channel. The mobile station thereafter monitors the forward channel and determines whether its MSI is associated with the power control sub-channel it previously selected.

By enabling fast power level supervision by the base station, the potential interference that could have been caused by a rogue or uncontrolled mobile station is drastically reduced. In addition, by speeding the traffic channel assignment process, the present inventive method and apparatus facilitates short duration data calls, increases system capacity and throughput, and reduces the system costs associated with dormant mobile stations. Another embodiment of the present invention reduces the randomness of the channel selection process and thereby reduces the chance of collisions. In accordance with this alternative embodiment, the base station advertises the identities of available traffic channels (and available power control sub-channels) via the forward link control channel. In accordance with this embodiment, rather than randomly selecting a traffic channel based on its MSI, the mobile station selects an available channel (and associated power control sub-channel) from the available channel list advertised by the base station. After selecting the available channel and power control sub-channel, the mobile station initiates the channel assignment process using the access probe described in the first embodiment. Another alternative embodiment is described wherein the base station, and not the mobile station, initiates a traffic channel request. This embodiment is used when the base station has data identified for a selected mobile station. In accordance with this embodiment, whenever a base station has data identified for a particular mobile station that is currently not connected to the base station, a base station controller directs all base stations within the selected mobile station's paging radius to transmit "page" messages to the mobile station over the forward link. The base stations use the mobile station's MSI to identify the page messages as directed to a particular mobile station. The mobile station continuously monitors the control channel and responds to pages addressed to its associated MSI. When the mobile station detects pages addressed to it (i.e., pages containing its MSI), it uses one of the methods described above to complete the traffic channel assignment process.

In yet another alternative embodiment, the base station initiates a traffic channel assignment by advertising both the identity of the selected mobile station and an associated power control sub-channel over the forward link control channel. The mobile station continuously monitors the forward link control channel and detects pages containing its associated MSI. When the mobile station identifies its page it transmits a traffic channel request message as described above. However, the mobile station also immediately begins monitoring the power control sub-channel identified in the page message.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 1:
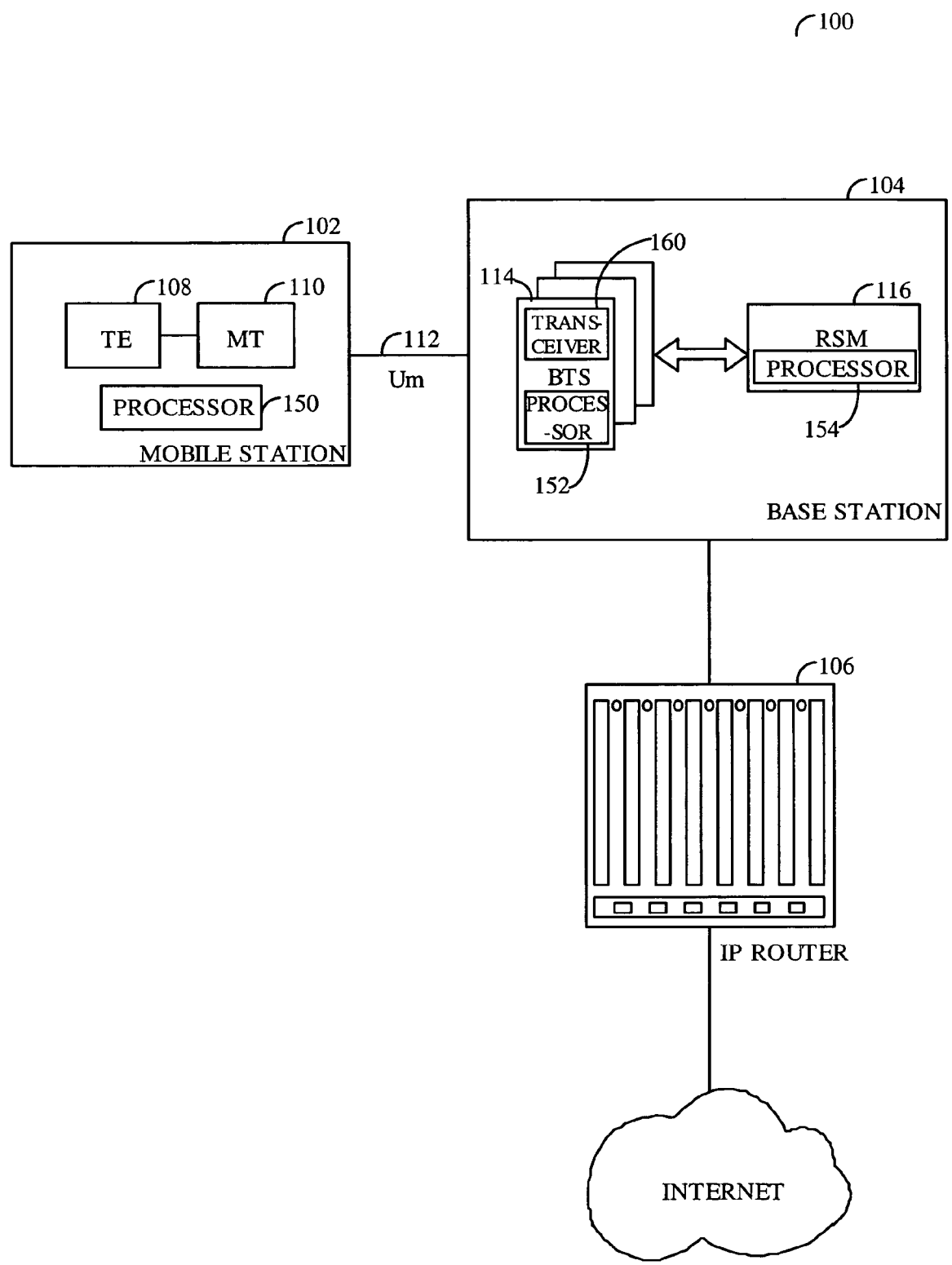
FIG. 1 is a block diagram of an exemplary wireless packet data communication system adapted for use with the present invention.

An Exemplary Wide-Area High-Speed Packet Data Communication System Adapted to Use the Present Rapid Traffic Channel Assignment Method and Apparatus The present inventive method and apparatus is intended for use in a high-speed cellular/Personal Communication System (PCS) CDMA system that provides wide-area high-speed packet data connectivity for both fixed and mobile terminals. A block diagram of such an exemplary packet data communication system is shown in FIG. 1. As shown in FIG. 1, the cellular/PCS packet data communication system 100 includes at least one mobile station 102, at least one base station 104, and an interface with some type of data router, shown in FIG. 1 as Internet Protocol (IP) router 106. The mobile stations 102 typically include a terminal equipment (TE) block 108 and a mobile termination (MT) block 110. The TE block 108 comprises a device that provides an interface to a human operator. Typically, the TE 108 comprises a laptop computing device, personal digital assistant (PDA), handheld computing device, or the like. The MT block 110 comprises a modulator/demodulator (modem) capable of modulating (and demodulating) data into radio-frequency signals compatible with the air interface used by the cellular/PCS CDMA system 100. The MT block 110 is typically implemented using a PCMCIA compatible card, an external modem, or a module within the TE block 108.

As shown in FIG. 1, the mobile station 102 communicates with the base station 104 via an air interface or airlink 112. The base station 104 typically comprises at least one network access point or base station transceiver subsystem (BTS) 114 with a transceiver 160 and at least one radio link protocol (RLP) and signaling manager (RSM) 116. The BTS 114 provides the communication interface between the plurality of radio frequency (RF) mobile stations 102 and a fixed (typically wired) data communications network. The RSM 116 performs signaling and radio link protocol management functions. In addition, the RSM maps user addresses provided by a data router (for example, as shown in FIG. 1, the IP router 106) to mobile station identifiers, and vice versa. Some systems include only one RSM 116 per base station 104; others may include an RSM 116 for each BTS 114. A more detailed description of the operation and functions performed by the mobile station 102, the base station 104, and the IP router 106 is beyond the scope of the present invention.

The packet data communication system 100 uses additional and separate RF channels channel (i.e., different RF channels) from those used by the existing IS-95 systems. The RF channels support the transmission of packet data transmissions over the airlink 112 between the plurality of mobile stations 102 and the plurality of base stations 104. The traffic channels typically include a power control sub-channel (Pi) and a channel identifier (Wi). The channel identifiers are used to identify transmissions originating from and destined to a mobile station i. All base stations 104 in the packet data communication system 100 preferably transmit pilot, control channel and reverse link power control information to the mobile stations 102 in a burst-continuous manner. The base stations 104 preferably use the control channels to broadcast or "advertise" system-wide parameters to the mobile stations 102. In addition, the control channels can be used to provide data to mobile stations that have not yet been assigned traffic channels, or as an alternative to using the traffic channel for data communications. The mobile stations 102 continuously monitor the forward link control channels.

The packet data communication system 100 of FIG. 1 may optionally be deployed in conjunction with or independently from an existing IS-95 compliant CDMA communication system. When deployed independently from existing IS-95 systems (or when deployed in a location where no IS-95 systems exist), the system 100 has no interaction with the underlying voice services provided by the IS-95 systems. In contrast, when deployed in conjunction with an existing IS-95 system, the control channels carry information related to the IS-95 system to support handoffs from the system 100 to the IS-95 system. In addition, the information carried on the system 100 control channels facilitates the exchange of information between the IS-95 system and the packet data communication system 100 of FIG. 1. For example, in addition to other messages, the delivery of mobile-terminated short message services (SMS) and call delivery notifications from the IS-95 system to the system 100 of FIG. 1 are also supported.

The system 100 forward links differ from the IS-95 forward links in some important respects. For example, the system 100 forward links are entirely dedicated to a single mobile station 102 at any given instant in time. That is, at any given instant in time, a base station 104 is permitted to transmit on the forward channel to a mobile station 102 in a one-to-one communication link thereby providing the mobile station all of the available forward link capacity. In contrast, in an IS-95 system, base stations may transmit to multiple mobile stations, and a mobile station may receive transmissions from more than one base station. In the system 100, the transmission rate used on the forward link corresponds to the transmission rate requested by the mobile station on the reverse link.

The pilot channels transmitted by the base stations 104 over the forward links of system 100 also differ from those transmitted over the IS-95 forward links. In IS-95 communication systems, base stations continuously transmit a pilot channel comprising an unmodulated, direct-sequence spread spectrum signal. The IS-95 pilot channel allows mobile stations to acquire the timing of the forward channel, provides a phase reference for coherent demodulation, and provides a means for signal strength comparisons between base stations for determining when to perform a handoff operation. In contrast, the pilot channel used in the system 100 comprises a burst transmission embedded in the forward link traffic stream. The mobile stations 102 continuously monitor and measure the relative strengths of the pilot channels transmitted by the base stations 104.

Mobile stations preferably register with the base station that is transmitting the strongest pilot channel signal. After powering on, or after entering a new cell area, the mobile station 102 sends a registration message to the base station 104 that is transmitting the strongest pilot signal to the mobile station 102. The mobile station 102 identifies itself using a randomly generated identification number in the first registration message that it sends to the base station 104. The base station 104 assigns the mobile station a system-generated mobile station identifier (MSI) when it receives the registration message from the mobile station 102. The base station 104 then transmits the MSI to the mobile station 102 in an MSI assignment message via the forward link control channel. Both the base station and mobile station use the MSI to identify the mobile station in any subsequent messages (including traffic channel requests).

In one embodiment of the present method and apparatus, mobile stations initiate communication with base stations by transmitting access probes to the base stations using access channels in the reverse communication link of the airlink 112. The mobile stations randomly select an access channel when requesting a traffic channel assignment from a base station. Because the mobile stations use random access transmissions on the access channels, the access channels preferably support mechanisms for collision detection and resolution. The mobile stations use the access channels to transmit traffic channel requests to a selected base station. In addition to facilitating traffic channel requests, the access channels are also used during the registration process to transmit registration messages from the mobile stations to selected base stations. The access channels may also be used to carry short messages.

Mobile Station Initiated Traffic Channel Assignment

In one embodiment of the present method and apparatus, a mobile station requests the assignment of a data traffic channel from a selected base station by transmitting access probes of increasing power until the access attempt is either successful or the access attempt terminates. In accordance with the present method and apparatus, the mobile station transmits a sequence of access probes having the format shown in FIG. 2. Each probe 200 in a sequence is transmitted at increased power levels until either the message contained in the probe is acknowledged or the sequence elapses. The mobile station typically monitors the forward link control channel and the forward link traffic channel (in cases where the mobile station has already been assigned an MSI) while it is transmitting access probes on the access channel.

Figure 2:
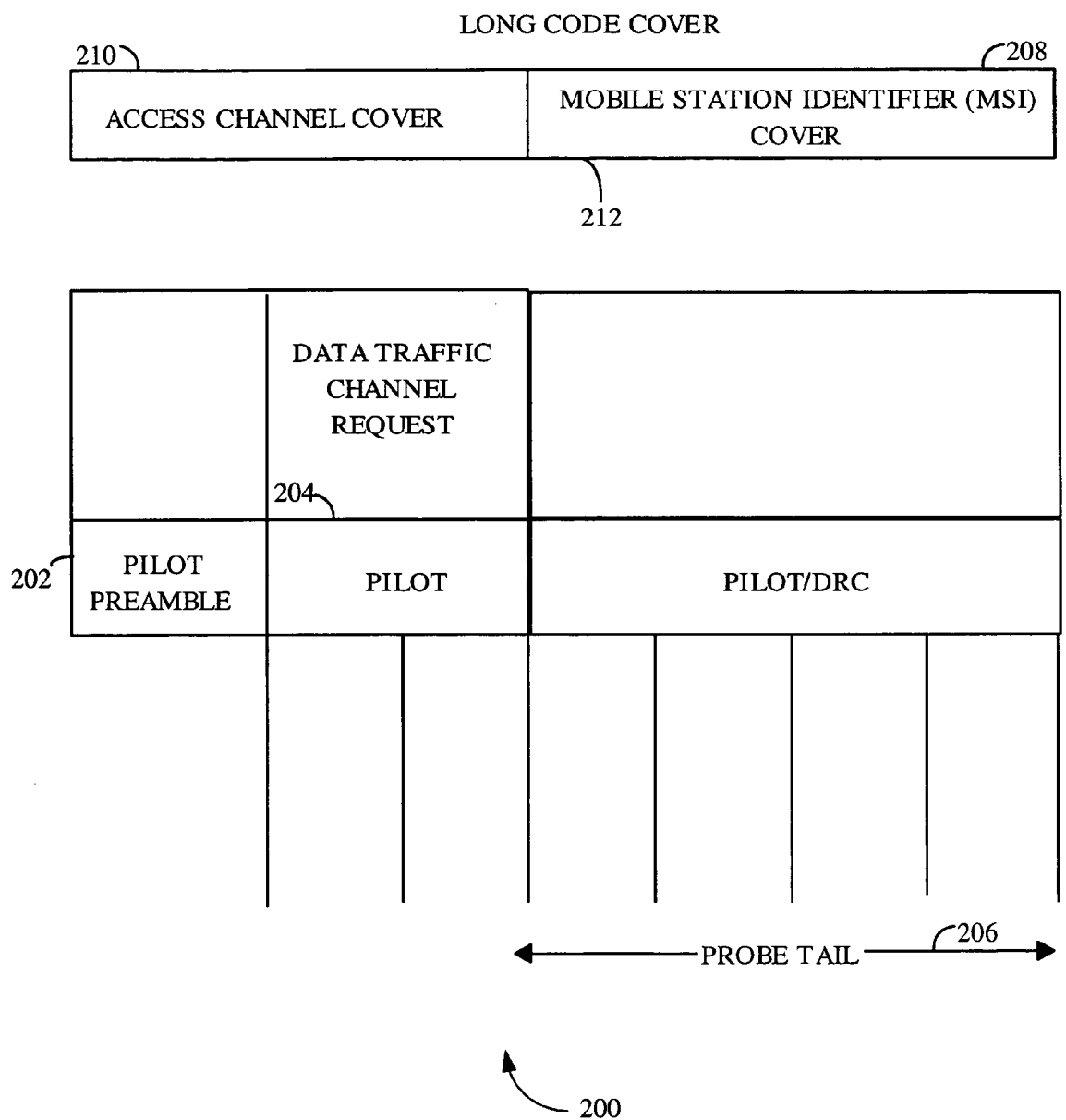
FIG. 2 shows an example of an access probe used to practice the rapid traffic channel assignment method and apparatus of the present invention.

As shown in FIG. 2, the access probe 200 comprises a pilot preamble 202, a traffic channel request 204, and a pilot/data request channel (DRC) field or "probe tail" 206. A long code cover 208 is used to cover or mask the mobile station's transmissions. The long code cover preferably comprises an access channel cover 210 and a mobile station identifier (MSI) cover 212. The long code cover 208 determines the communication channel used by the mobile station at any given instant in time. For example, the mobile station transmits on the access channel when it uses the access channel cover 210 to cover its transmissions. Similarly, the mobile station transmits on the traffic channel identified by its MSI when it uses the MSI cover 212 to cover its transmissions. Note that all mobile stations use the same access channel cover 210 when transmitting on a selected access channel.

The pilot preamble 202 allows the selected base station to easily detect the access probe transmission. The pilot is a known sequence of data that can be readily detected by the base station. In one mode of operation, when the mobile station is connected to the base station and transmitting data (i.e., when the mobile station is in a "connected" state), the mobile station continuously transmits the pilot channel to the base station. In this state, the base station uses the pilot channel to track the mobile station and control its power transmissions. In addition, the base station uses the pilot channel as a phase reference to coherently demodulate data that is transmitted by the mobile station.

In accordance with the present method and apparatus, immediately following transmission of the pilot preamble 202, the mobile station transmits the traffic channel request message 204. The traffic channel request 204 includes data that identifies the mobile station to the base station. When requesting a traffic channel, the mobile station should previously have been assigned an MSI by the base station (as a result of a previous registration operation) and therefore, the mobile station preferably includes its MSI as a part of the traffic channel request 204. If an MSI was not previously obtained, the mobile station should first register with the base station before initiating a traffic channel request. During the registration process, the mobile station uses a randomly generated number instead of the MSI. After obtaining an MSI from the base station, the mobile station uses the MSI to identify itself during subsequent transmissions.

In addition to transmitting its identifier, the mobile station also transmits data (in the traffic channel request 204) that identifies the signal strengths and identities of all other base stations having received signal strengths exceeding a predetermined threshold.

In one embodiment of the present invention, the traffic channel request includes a transaction identifier, a reference pilot, a pilot strength indicator, and a timer status field. The transaction identifier identifies each transaction between the requesting mobile station and the selected base station. The mobile station sets the transaction identifier to a selected number and uses this number in other messages associated with the transaction. The reference pilot is set by the mobile station to the pseudo-noise (PN) sequence offset of the pilot channel used by the mobile station to derive its time reference (the reference pilot), relative to a zero offset pilot PN sequence. The pilot strength indicator is set by the mobile station to a computed value that is based upon the strength of the pilot channel received from the base station. In one embodiment, this strength estimate is computed as the sum of the ratios of received pilot energy per "chip" ("Ec") to the total received spectral density ("Io") (signal and noise energy), for at most k multi-path components (where k is the maximum number of multi-path components that can be concurrently demodulated by the mobile station). The timer status field is set by the mobile station and indicates whether a pilot drop timer corresponding to the pilot channel has expired.

In accordance with the present inventive method and apparatus, immediately after transmitting the traffic channel request 204, the mobile station can begin using the reverse link traffic channel, defined by Wi (i.e., identified by its MSI), to transmit what is effectively reverse link traffic data to the base station. The mobile station transmits the probe tail 206 on the reverse link traffic channel identified by its MSI. The probe tail 206 comprises pilot channel information and data request channel (DRC) information. The mobile station preferably transmits its DRC to the "best" base station it can receive (i.e., the base station having the strongest signal received by the mobile station). The mobile station uses the DRC to request a data channel that has the maximum data rate that the mobile station can reliably demodulate. The mobile station must transmit the pilot/DRC channel to allow the selected base station to track it and to control the mobile station's transmission power. The mobile station continues to transmit the pilot/DRC channel for a time period defined by the probe tail 206. This time period is a parameter that is advertised by the base station on the forward link control channel.

Advantageously, the mobile station need not wait to receive a traffic channel assignment, as it must do in the prior art CDMA systems described above. Rather, in accordance with the present inventive method and apparatus, immediately after transmitting its access probe 200, the mobile station begins using the reverse link traffic channel identified by its MSI. The mobile station immediately begins transmitting pilot and DRC information on the reverse link. In addition, the mobile station can immediately begin obtaining data via the forward link without waiting for the base station to authenticate and acknowledge the traffic channel request as is required by the prior art call processing methods. In essence, the traffic channels are "pre-assigned" using the present method and apparatus.

When the base station receives the access probe 200, it transmits a traffic channel assignment message on the forward link traffic channel at the data rate defined in the DRC message previously transmitted by the mobile station. The base station can complete the assignment of traffic channels for all base stations requested by the mobile station (including the assignment of all necessary resources) before transmitting the first traffic channel assignment to the mobile station. Alternatively, and especially in cases when the traffic channel assignment process would require exceeding the period defined by the probe tail 206, the base station can transmit a first traffic channel assignment to the mobile station thereby assigning it the power control sub-channel used by the accessed base station. Subsequently, the base station can complete the traffic channel assignment process by transmitting additional traffic channel assignment messages once the resource allocation process is complete. The only additional parameter that is required to complete the traffic channel assignment process is the identity of the power control sub-channel.

In one embodiment, the base station specifies in the traffic channel assignment message the parameters of all of the traffic channels assigned to serve a specified mobile station. For example, in one embodiment, the traffic channel assignment message includes a transaction identifier, a channel record (comprising a thirty-two bit number to identify the channel assigned to the mobile station), one or more occurrences of a pilot pseudo-random noise ("PilotPN") field, and a power control bit field. The transaction identifier identifies each transaction between the mobile station and the base station. The base station sets the transaction identifier to a selected number and uses this number in other messages associated with the transaction (e.g., traffic channel request messages and registration messages). The channel record includes both a system channel RF frequency to be used by the mobile station and a related CDMA system type. The pilotPN field contains the PN offset of the base station that the mobile station will communicate with in order to exchange subsequent traffic channel transmissions. The base station associated with the PN offset will transmit a power control bit to the mobile station during subsequent traffic data exchanges. In addition, the mobile station uses the pilotPN field to identify the base station that it is allowed to transmit its DRC channel to. This field also informs the mobile station of the control channel and forward traffic channel that the mobile station will monitor. The power control bit field is set by the base station to indicate the power control sub-channel number assigned to the mobile station.

As described above with reference to the prior art CDMA systems, because mobile stations transmit over a wide range of transmission power levels, it is advantageous to enable the base stations to supervise the mobile stations as soon as possible after the mobile stations attempt to access the system. By supervising the mobile stations as early as possible in the channel assignment process, the base station limits the mobile stations' transmit power to levels that are sufficient to close the reverse link, but no greater. The potential interference that could be caused by a rogue mobile station transmitting at uncontrolled transmit power levels is thereby reduced or eliminated.

In the CDMA system 100 designed for use with the present invention, a power control sub-channel is used by the base station to control the transmit power of the mobile stations. The power control sub-channel comprises information bits that are transmitted on the forward link. The base station continuously transmits "up/down" power control bits to the mobile station based upon measurements of the reverse link signal quality. If the reverse link signal quality is above/below a target threshold, a "down"/"up" bit is sent and the mobile adjusts its transmitter power a discrete amount in the direction indicated by the control bit. Thus, the power control sub-channel is used to inform the mobile station to either increase or decrease its transmitter power. In the system contemplated for use with the present invention, a limited number of power control sub-channel groups are available to the mobile station. For example, in one exemplary system, only thirty-two power control channels are available.

In order for the mobile station to begin transmitting data on the reverse link immediately after transmission of the access probe, the mobile station must select one from among the available power control groups. In accordance with one embodiment of the present invention, the base station advertises a range of available power control groups on the forward link. The mobile station randomly selects one of the available power control groups and requests the selected group in the access probe. Thereafter, the mobile station uses the selected power control group to begin transmitting data on the reverse channel. As soon as the mobile station selects a power control sub-channel, the base station removes the selected sub-channel from the available power control sub-channel list. The time necessary to detect a power control group selection and to remove the selected group from the available power control sub-channel list is very short as compared to the mean time between call originations. Therefore, there is very little chance that two mobile stations will randomly select the same power control sub-channel. However, should two mobile stations choose the same power control bits, the call will terminate in a call set-up failure and the mobile station will re-initiate the call processing sequence.

After the mobile station selects the power control sub-channel, the base station associates the mobile's MSI with the selected power control sub-channel. The MSI and power control sub-channel associations are subsequently transmitted on the forward link to be verified by the mobile station. The mobile station checks whether its MSI matches with the power control sub-channel that it previously selected during the channel assignment process. If a correct match is found, the mobile station continues the call to exchange data with the base station. However, if an incorrect match is found, and the power control sub-channel that it selected is erroneously associated with some other MSI, the mobile station will terminate the call and attempt to re-initiate the call.

Thus, one advantage provided by the present invention is the ability of a base station to immediately begin controlling the transmission power of a mobile station once the mobile station accesses the CDMA system 100. The mobile station is immediately transmitting on the traffic channel identified by its MSI once it transmits its access probe. The base station thereby immediately supervises the mobile station as soon as the mobile station begins to transmit data over the traffic channel.

As described above, the present invention improves the traffic channel assignment process by allowing a mobile station to rapidly obtain a traffic channel after it transmits an access probe. The improvement in channel assignment speed is partly due to the manner in which the packet data CDMA system 100 manages the mobile station's MSI. Further, reverse link acquisition is not required using the present method and apparatus.

In contrast to the prior art approaches described above, the MSI used by the present inventive method and apparatus is a randomly generated number that is assigned by the wireless packet data system to a mobile station when the mobile station registers with the system and opens a point-to-point connection. The MSI allows the system to differentiate between different users. The prior art systems base the PN sequences on the mobile station's ESN. However, the MSI used by the present invention allows the wireless packet data system to address a mobile station without using its actual identification number (e.g., its ESN). In contrast to the mobile station's ESN, the MSI is simply a temporary identifier used by the system to communicate with the mobile station. In one embodiment, the MSI is randomly generated at the beginning of each session, and is de-assigned when the session terminates. In this embodiment, an acceptably low collision rate results because the MSI comprises a relatively large number (e.g., thirty-two bits). On the rare occasions that a collision occurs (when two mobile stations are randomly assigned an identical MSI), a call set-up failure occurs. However, because the MSI is a large number, the call set-up failure rate remains acceptably low.

The MSI is used on the forward link to identify forward link traffic data intended for a particular mobile station. Forward link data is prefaced with data preambles. Each preamble is covered with the appropriate MSI, and the covered data is transmitted over the forward link. The mobile stations monitor the forward channel looking for data that is covered with its associated MSI. When a matching MSI is found, the mobile stations de-cover the associated data.

Another advantage provided by the present invention is an increase in system capacity. Because the present invention speeds the channel assignment process, mobile stations can use the communication system intermittently or for short duration service sessions as necessary to accommodate short duration data transactions. Using the present invention, mobile stations can disconnect from or "tear down" the airlink whenever they are not sending data (e.g., when the mobile stations are in a dormant state). In contrast, in the prior art CDMA systems, due to the overhead associated with the channel assignment process, mobile stations are forced to maintain the airlink even when they are not exchanging data with the base station. By allowing the mobile stations to release the airlinks more frequently, precious resources can be freed and made available for other active mobile stations. Thus, system capacity is increased using the present invention. Both the mobile station and the base station can maintain state on either side of the link, and tear down the airlink when there is no further data to transmit. The present invention thus facilitates short duration data exchanges by speeding the channel assignment process.

In accordance with the present invention, rather than requiring between two and three seconds to acquire a traffic channel (as required in the prior art systems), a mobile station acquires a traffic channel within the time period defined by the probe tail 206 (FIG. 2). As described above with reference to FIG. 2, the base station advertises the probe tail period via the forward link control channel. In one embodiment of the present invention, this time period comprises only a few short twenty-six millisecond intervals. For example, the probe tail 206 shown in FIG. 2 comprises four twenty-six-millisecond intervals, or approximately 0.11 seconds. Thus, in the embodiment shown in FIG. 2, a mobile station acquires a traffic channel in approximately one-tenth of a second. This represents a tremendous channel assignment speed advantage over the prior art techniques.

In addition, a power control sub-channel is assigned to a mobile station in the same short time period. As described above, it is extremely advantageous to allow the base station to control the mobile station's transmit power as early as possible in the channel assignment process. Using the inventive method described above with reference to FIG. 2, the mobile station is supervised by the base station within approximately 0.11 seconds after the access probe is transmitted. Once again, this is a vast improvement over the prior art techniques.

Advantageously, the present invention allows the base stations to use the traffic channel, and not the control channel, for transmitting the traffic channel assignment message to the requesting mobile station. In the system contemplated for use with the present invention, the traffic channel operates at a far higher rate than does the control channel. Therefore, the traffic channel assignment message is transmitted to the mobile station at a much higher rate than was previously available using the prior art systems i.e. a capacity advantage.

Base Station Advertisement of Available Traffic Channels

As described above, because the mobile station randomly selects the traffic channel, and because the mobile station also randomly selects an available power control sub-channel, a relatively small chance of collision exists. That is, there is a relatively small chance that more than one mobile station will randomly select either the same traffic channel or the same power control sub-channel. However, in cases where collisions cannot be tolerated by the wireless communication system, an alternative embodiment of the present invention is available that reduces the randomness of the channel selection process, and thereby reduces or eliminates the collision rate. In accordance with this alternative embodiment, a base station uses the control channel to advertise the identity of available traffic channels.

In accordance with this embodiment, the available traffic channels are advertised on the control channel as channel identifier and associated power control sub-channel couples or pairs. For example, in one embodiment, the base station transmits a plurality of available channel pairs defined as (Wi, Pi), where Wi represents the identity of an available traffic channel, and Pi represents the identity of its associated power control sub-channel. The traffic channel request and assignment process is similar to that described above with reference to FIG. 2, except that, instead of randomly selecting a traffic channel based on its MSI, the mobile station selects a channel pair from the available channel list advertised by the base station. The base station detects the selection and removes the selected pair from the available channel list.

After choosing an available channel pair (Wi, Pi), the mobile station transmits an access probe on the access channel in the manner described above with reference to FIG. 2. The base station determines whether more than one mobile station requested the same traffic channel pair. If more than one mobile station attempted to use the same traffic channel pair, the base station releases one or more mobile stations that then re-initiate calls. The remainder of the channel assignment process proceeds as described above with reference to FIG. 2.

This alternative embodiment reduces the potential collisions that may occur using a totally random channel (and power control sub-channel) selection process. In accordance with this embodiment, the mobile station is assigned a power control sub-channel (defined by Pi) that is available from the moment the mobile station begins using the traffic channel. Thus, the base station can immediately supervise the mobile station (i.e., control its transmission power) using the selected power control sub-channel as soon as it receives the traffic channel request. As described above, there is a chance that more than one mobile station will select the same power control sub-channel from those that are available (i.e. that a collision will occur). However, because the base station detects the selection and removes the selected pair from the advertised list in a very short time frame compared to the time necessary to initiate a call, the chance of collision is very small. However, in case of collision, the call will terminate in a call set-up failure. Because collisions occur only very rarely, the call set-up failure rate is acceptably low using the present invention. For example, using this embodiment of the present invention, collisions will occur only when equidistant mobile stations simultaneously select the same available traffic channel pair (Wi, Pi). Effectively, this embodiment advantageously creates multiple access channels that can carry traffic channel request messages.

Base Station Initiated Traffic Channel Assignment

In an alternative embodiment of the present method and apparatus, the base station, and not the mobile station, initiates data calls and subsequent traffic channel assignments. This case occurs when data is presented to a base station that requires transmission to a particular mobile station (e.g., an Internet provider sends data associated with a particular mobile station). In accordance with this embodiment, whenever a base station is presented with data for transmission to a mobile station that is not currently connected to the base station (i.e., the mobile station is in an "idle" state), the base station initiates the traffic channel assignment process. When data is to be transmitted to a particular mobile station, a base station controller directs all base stations within the mobile station's paging radius (i.e., where the mobile station is most likely to be presently located) to send "page" messages on the forward link control channel. The page messages advertise the mobile station's identity using the mobile station's MSI. The page messages are sent in an initial transmission on the control channel (referred to as a "capsule"). The mobile station continuously monitors the control channel and responds to pages addressed to its associated MSI. Once the mobile station receives its page message, it preferably uses either of the two inventive traffic channel assignment methods described above to initiate a traffic channel request.

Fast Base Station Initiated Traffic Channel Assignment

In another alternative embodiment of the present method and apparatus, the base station initiates a traffic channel assignment by advertising both the identities of a destination mobile station (using the mobile station's MSI as an identifier) and an associated power control sub-channel over the control channel. As described above, the base station initiates a traffic channel assignment whenever data is presented to a base station requiring transmission to a particular mobile station. Similarly to the alternative embodiment described above, all base stations within the paging radius of the destination mobile station transmit a page message to the mobile station via the control channel. However, in accordance with this alternative embodiment, the base station not only advertises the mobile station's MSI in a control channel page message, but it also advertises an associated power control sub-channel. The mobile station continuously monitors the forward link control channel and subsequently identifies the page message associated with its MSI.

When the mobile station detects its page message and its associated power control sub-channel, it transmits a traffic channel request (in a manner described above with reference the inventive traffic channel assignment method and apparatus) to the base station on the reverse link traffic channel defined by its MSI. The mobile station immediately begins monitoring the forward link power control sub-channel defined in the page message. Advantageously, the base station may immediately begin using the assigned power control sub-channel to control the transmission power of the selected mobile station.

The rapid channel assignment method of the present invention preferably executes on microprocessors 150. 152, 154 or other data processing devices in both the mobile station and the base station. The mobile station cooperates with the base station as described above to rapidly and efficiently request and assign traffic channels in a wireless packet communication system. The method and apparatus of the present invention can alternatively be implemented using any convenient or desirable sequencing devices such as state machines, present state-next state discrete logic, or field programmable gate array devices. The rapid channel assignment methods described above can be implemented in hardware (i.e., "hardwired") or alternatively can be implemented using programmable devices.

In summary, the method and apparatus includes a means for rapidly assigning traffic channels to requesting mobile stations in a wireless high-speed packet data communication system. The present method and apparatus allows a mobile station to begin using a selected reverse traffic channel immediately or soon after transmitting a traffic channel request to a selected base station. In accordance with the present invention, a mobile station sends an access probe on a randomly selected access channel to the selected base station. The access probe comprises a pilot preamble, a traffic channel request, and a pilot/DRC field. The pilot preamble allows the base station to easily detect the access probe transmission from the mobile station. The traffic channel request includes data that identifies the mobile station to the base station. The mobile station continues to transmit the pilot/DRC field for a period defined by a probe tail parameter advertised by the base station. Advantageously, the mobile station is assigned a traffic channel in a very short time period as compared with prior art assignment techniques. In addition, the mobile station is assigned a power control sub-channel almost immediately.

The present invention advantageously reduces the time delays heretofore associated with the traffic channel request and assignment process. The present invention improves system capacity, frees valuable system resources, enables early power supervision of mobile stations, and facilitates use of short duration data transactions in a wireless packet data cellular communication system. By reducing the amount time associated with the call setup process, the present invention reduces the system costs associated with dormant mobile stations. The present invention is particularly useful in a cellular/PCS CDMA system that provides wide-area high-speed packet data connectivity for both fixed and mobile terminals. However, it also finds utility in any broadband wireless data communication system that requires rapid assignment of traffic channels to mobile stations.

A number of embodiments of the present invention have been described. Nevertheless, it will be understood that various modifications may be made without departing from the spirit and scope of the invention. For example, although one embodiment of the access probe is shown in FIG. 2, the present invention can utilize a wide variety of access probe formats. For example, the duration of the pilot preamble, traffic channel request, and pilot/DRC field can vary from the duration shown in FIG. 2. The mobile station can transmit a pilot preamble for a duration that exceeds the twenty-six-millisecond frame shown in FIG. 2. Similarly, in an alternative embodiment, the traffic channel request can be transmitted after the transmission of some other reverse link data. Additionally, the present invention may use a variety of system-generated parameters to identify mobile stations. For example, the present invention may alternatively use mobile station serial numbers, universal mobile station names similar to the well-known Internet domain names, a hash function of the universal mobile station names and universal mobile station identifiers similar to those used in IS-95.

Accordingly, it is to be understood that the invention is not to be limited by the specific illustrated embodiment, but only by the scope of the appended claims.

What is claimed is:

1. A mobile station operable to communicate wirelessly with a base station, the mobile station comprising:
a processor configured to select an access channel; and
a mobile termination block configured to (a) transmit a pilot preamble and a traffic channel request to a base station on the selected access channel, the traffic channel request comprising a mobile station identifier, and (b) transmit data on a traffic channel identified by the mobile station identifier to the base station without waiting to receive a traffic channel assignment from the base station.

2. The mobile station of claim 1, wherein the processor is further configured to (a) determine which base station is sending a pilot signal which is stronger than any other pilot signal received by the mobile station and (b) select an access channel to send the a pilot preamble and traffic channel request to the determined base station.

3. The mobile station of claim 1, wherein the processor is configured to randomly select the access channel from a plurality of access channels.

4. The mobile station of claim 1, wherein the processor is configured to select the access channel from a list of access channels advertised by the base station.

5. The mobile station of claim 1, wherein the pilot preamble and traffic channel request are masked with a long code access channel cover.

6. The mobile station of claim 1, wherein the pilot preamble comprises a sequence of data that is detectable by the base station.

7. The mobile station of claim 1, wherein the mobile station is configured to register with a wireless system comprising the base station, the wireless system assigning the mobile station identifier and sending the mobile station identifier to the mobile station.

8. The mobile station of claim 1, Wherein the traffic channel request further comprises a transaction identifier, a reference pilot, a pilot strength indicator, and a timer status field.

9. The mobile station of claim 1, wherein the traffic channel request further comprises signal strengths and identities of all base stations having received signal strengths exceeding a threshold.

10. The mobile station of claim 1, wherein the mobile termination block is further configured to transmit a data request channel (DRC) on the traffic channel after transmitting the pilot preamble and traffic channel request on the access channel.

11. The mobile station of claim 10, wherein the data request channel (DRC) is masked with a long code comprising a mobile station identifier (MSI) cover.

12. The mobile station of claim 10, wherein the DRC comprises traffic channel data rate information usable by the mobile station to request a maximum data rate from the base station with which the mobile station can reliably demodulate data.

13. The mobile station of claim 10, wherein the mobile station is configured to continue transmitting the DRC for a pre-defined time period.

14. The mobile station of claim 1, wherein the mobile termination block is further configured to transmit pilot channel information on the traffic channel after transmitting the pilot preamble and traffic channel request on the access channel.

15. The mobile station of claim 14, wherein the pilot channel information is masked with a long code comprising a mobile station identifier (MSI) cover.

16. The mobile station of claim 1, further comprising a receiver configured to receive a traffic channel assignment message transmitted by the base station.

17. The mobile station of claim 1, wherein the mobile termination block is configured to use Code Division Multiple Access (CDMA) to process data for transmission to the base station.

18. The mobile station of claim 1, wherein the mobile termination block is configured to transmit a sequence of pilot preambles and traffic channel requests with increasing power until the traffic channel request is acknowledged by the base station or the sequence ends.

19. The mobile station of claim 1, wherein the processor is further configured to select a power control group from a plurality of power control groups for the mobile termination block to transmit data.

20. An apparatus comprising
a mobile termination block configured to receive page messages via a control channel sent by at least one base station; and
a processor configured to (a) determine whether one of the page messages is addressed to the apparatus, (b) select a reverse link access channel to transmit a traffic channel request whenever the processor determines a page message is addressed to the apparatus, wherein the mobile termination block is configured to transmit the traffic channel request to a base station using the selected reverse link access channel and transmit data on a traffic channel identified by a mobile station identifier before receiving a channel assignment from the base station.

21. The apparatus of claim 20, wherein the mobile termination block further transmits a pilot preamble along with The traffic channel request to a base. station using the selected reverse link access channel.

22. The apparatus of claim 20, wherein the data transmitted on a traffic channel identified by a mobile station identifier comprises a data request channel (DRC) field.

23. The apparatus of claim 20, wherein the processor selects one of a group of advertised available power control sub-channels for communicating with the base station.

24. The apparatus of claim 20, wherein the processor selects a traffic channel from list of advertised available traffic channels and associated available power control sub-channels for communicating with the base station.

25. A mobile station operable to communicate wirelessly with a base station, the mobile station comprising:
means for selecting an access channel; and
means for (a) transmitting a pilot preamble and a traffic channel request to a base station on the selected access channel, the traffic channel request comprising a mobile station identifier, and (b) transmitting data on a traffic channel identified by the mobile station identifier to the base station without waiting to receive a traffic channel assignment from the base station.

\* \* \* \* \*

UNITED STATES PATENT AND TRADEMARK OFFICE
CERTIFICATE OF CORRECTION

| | | |
|---|---|---|
| PATENT NO. | : 7,630,719 B2 | Page 1 of 1 |
| APPLICATION NO. | : 10/824920 | |
| DATED | : December 8, 2009 | |
| INVENTOR(S) | : Bender et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1335 days.

Signed and Sealed this

Twenty-first Day of December, 2010

David J. Kappos
*Director of the United States Patent and Trademark Office*